United States Patent Office
3,288,484
Patented Nov. 29, 1966

3,288,484
BOTTLE RETURN CART
Fredrick F. Brunette, Farmington, Mich., assignor to Brilliant Products, Incorporated, Plymouth, Mich., a corporation of Michigan
Filed May 21, 1964, Ser. No. 369,151
5 Claims. (Cl. 280—79.2)

The present invention relates to article transporting equipment and more particularly to a new cart structure for use in supermarkets and the like for storing and transporting such articles as returned beverage bottles.

A method used by most supermarkets today for handling returned bottles such as beverage bottles, milk bottles, and the like is to provide a designated area adjacent the entrance of the store for collecting the bottles. Some type of cart structure is usually provided to collect the bottles. After the cart has become full, it is pushed to the storage facilities of the store where it is emptied. Such a cart structure is preferably of a strong, light weight construction having a large volume to floor space ratio. The interior of the cart structure must be readily accessible since it generally is the practice to depend upon customers placing the returned bottles in the cart. It is also preferred that such a cart structure add to the appearance of the store since it in effect becomes one of the store's fixtures and is one of the first objects seen by an entering customer.

To meet these needs cart structures have heretofore been provided which are of a chrome plated wire construction. To add to the capacity of such structures without sacrificing floor space, some of the carts have heretofore been provided with a portion of the front or sides removed so that the cart can be made relatively deep without making access to the bottom of the cart difficult. While such a construction adds some volume to the cart it does not permit bottles to be stacked near the open portion.

Further, such returned carts of heretofore known construction have been either manufactured in separate chrome plated parts which are then welded together or have been welded together first and then chrome-plated subsequently. The first of these constructions provides a cart which is unsightly in appearance since it is not chrome plated at each of the numerous welded connections. The second method of manufacturing provides a finished appearing cart but because the carts are rather large and bulky, chrome plating of the cart in its entirety is difficult and expensive.

The present invention provides a cart constructed of individual chrome plated sections which are secured together by rivets to produce an economically manufactured, finished appearing bottle return cart.

To increase the capacity to floor space ratio, the bottle return cart of the present invention is constructed with relatively high side and rear walls and with a front wall section having an upper portion which can be lowered when the cart is relatively empty and which can be locked in an upper position as the cart is filled. In this way the entire depth of the cart can be utilized to collect empty bottles without sacrificing accessibility when the cart is empty.

It is an object then of the present invention to increase the capacity to floor space ratio of bottle return carts and the like by providing such a cart with a wall section having an upper portion which may be selectively lowered or locked in a raised position.

It is another object of the present invention to reduce the manufacturing costs of bottle return carts and the like by providing a new construction for such carts comprising the assembly of individually plated wall and floor sections secured together by a bracket and rivet connecting means.

It is still another object of the present invention to improve bottle return carts and the like by providing such a cart having a front wall comprising an upper portion and a lower portion and a novel hinge and locking means permitting the upper portion to be moved between a lowered position when the cart is relatively empty and an upper locked position in which the upper and lower portions form a complete front wall when the cart is relatively full.

Still further objects and advantages of the present invention will readily occur to one skilled in the art to which the invention pertains upon reference to the following drawings in which like reference characters refer to like parts throughout the several views and in which FIG. 1 is a front perspective view of a preferred bottle cart of the present invention and illustrating the movable upper portion of the front wall section in its upward locked position.

FIG. 3 is a front fragmentary perspective view of a portion of the structure shown in FIG. 1 enlarged somewhat for purposes of clarity, and FIG. 4 is a fragmentary cross-sectional view taken substantially on line 4—4 of FIG. 1 and enlarged somewhat for purposes of clarity.

Figure 1:
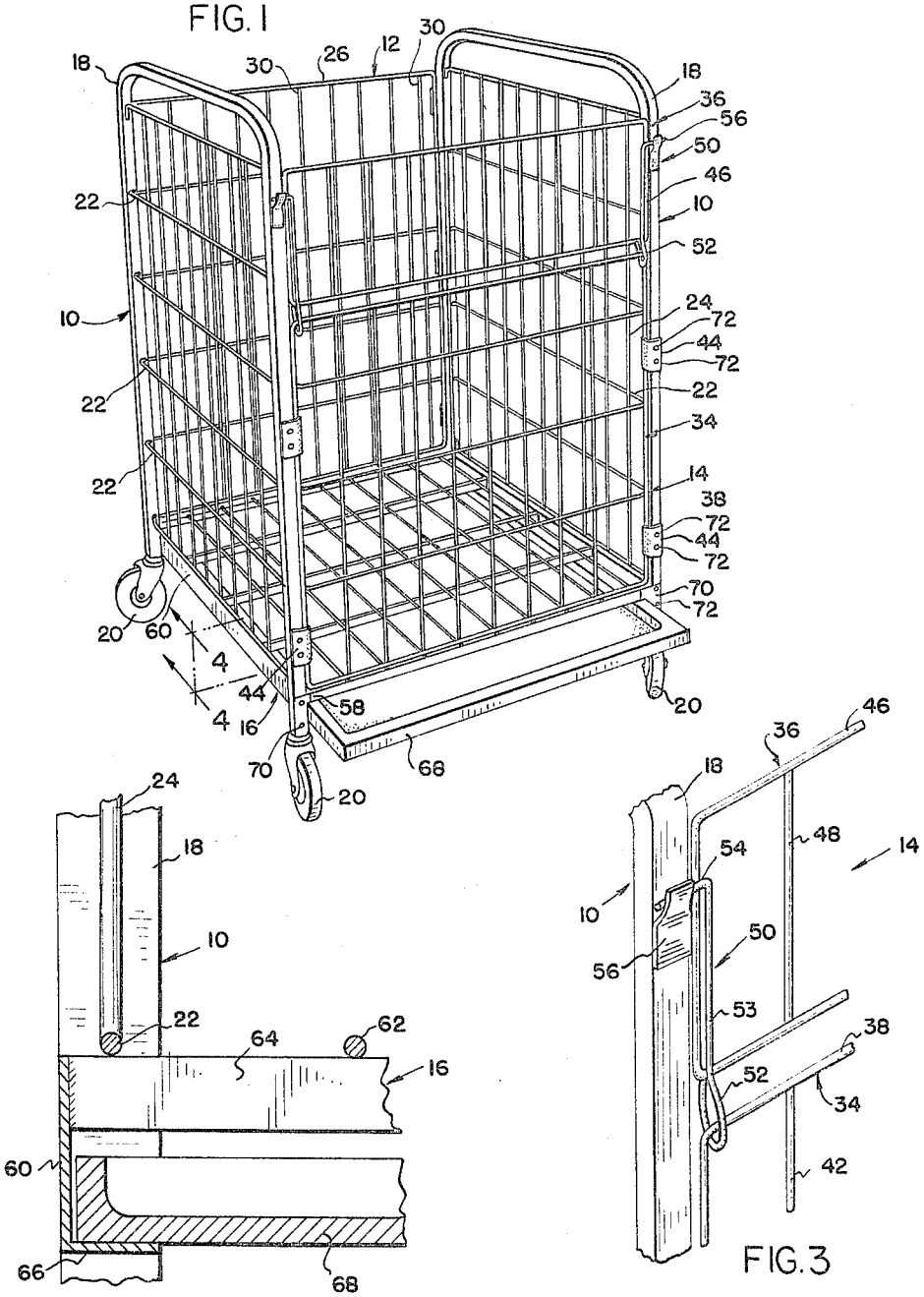

Now referring to the drawings for a more detailed description of the present invention, a preferred bottle return cart is therein illustrated as comprising side wall sections 10, a rear wall section 12, a front wall section 14, and a floor section 16.

The side wall sections 10 each preferably comprises a substantially inverted U-shape tubular framing member 18. A conventional swivel type wheel assembly 20 is carried at each free end of the framing member 18 in a conventional manner. A plurality of horizontally extending vertically spaced wire members 22 are welded between the legs of the frame member. Vertically extending horizontally spaced wire members 24 are preferably welded to the wire members 22.

The rear wall section 12 is preferably formed of a peripheral wire member 26 bent and welded in rectangular form to which are welded horizontally extending vertically spaced wire members 28 and vertically extending horizontally spaced wire members 30. Brackets 32 are preferably welded at vertically spaced points along each vertical edge of the peripheral wire member 26 to extend outwardly therefrom and are bent slightly to extend in planes substantially parallel to the planes containing the wire members 26, 28 and 30 of the rear wall section 12.

The front wall section 14 preferably comprises a lower portion 34 and an upper portion 36. The lower portion 34 preferably comprises a peripheral wire member 38 bent and welded in the form of a rectangle and to which are welded horizontally extending vertically spaced wire members 40 and vertically extending horizontally spaced wire members 42. Brackets 44 substantially similar to the brackets 32 are preferably welded at vertically spaced points along vertical portions of the peripheral wire member 38 to extend outwardly therefrom and are bent slightly to extend in planes substantially parallel to the planes containing wire members 38, 40 and 42 of the lower portion 34 of the front wall section 14.

The upper portion 36 of the front wall section 14 preferably comprises a peripheral wire member 46 bent and welded in the form of a rectangle and to which are welded a plurality of horizontally spaced vertically extending wire members 48. Hinge and locking means of wire construction as generally indicated at 50 are each provided with an elongated loop portion 52 which as can best be seen in FIG. 3 extends around the upper horizontal portion of the peripheral wire member 38. The loop portions 52 are closed by welding to the lower horizontal portion of the peripheral wire member 46 so that the hinge and locking means 50 are secured to the upper portion 36. In this way the upper portion 36 is hingedly connected to the lower portion 34 and is free to move a distance toward and away from the lower portion 34 substantially equal to the inner length of the loop portions 52. The hinge and locking means 50 are further preferably provided with an elongated medial portion 53 extending closely adjacent and substantially parallel to the vertical portions of the peripheral wire member 46 and with an outwardly bent end portion 54 which is adapted to be received by substantially S-shaped hooks 56 carried on the forward surface of the framing members 18 as will be described in greater detail below.

The floor section 16 preferably comprises a pair of spaced flat horizontally extending framing members 58 forming the front and rear edge of the floor section 16 and a pair of spaced angle members 60 extending horizontally between and welded to the framing members 58 to form the side edges of the floor section 16. A plurality of horizontally extending and horizontally spaced wire members 62 are preferably welded along the upper edges of the framing members 58. Cross support pieces 64 are preferably welded between the angle framing member 60 and below the wire members 62. The angle framing members 60 extend somewhat below the lower edge of the framing members 58 and are preferably provided at their lower edge with an inwardly extending flange portion 66. A tray member 68 is slidably removably carried on the flanged portions 66 of the angle framing members 60. Brackets 70 are secured at each end of the framing members 58 to extend outwardly and downwardly therefrom. The brackets 70 are preferably bent slightly to extend in planes substantially parallel to the outward faces of the angle members 58.

Figure 2:
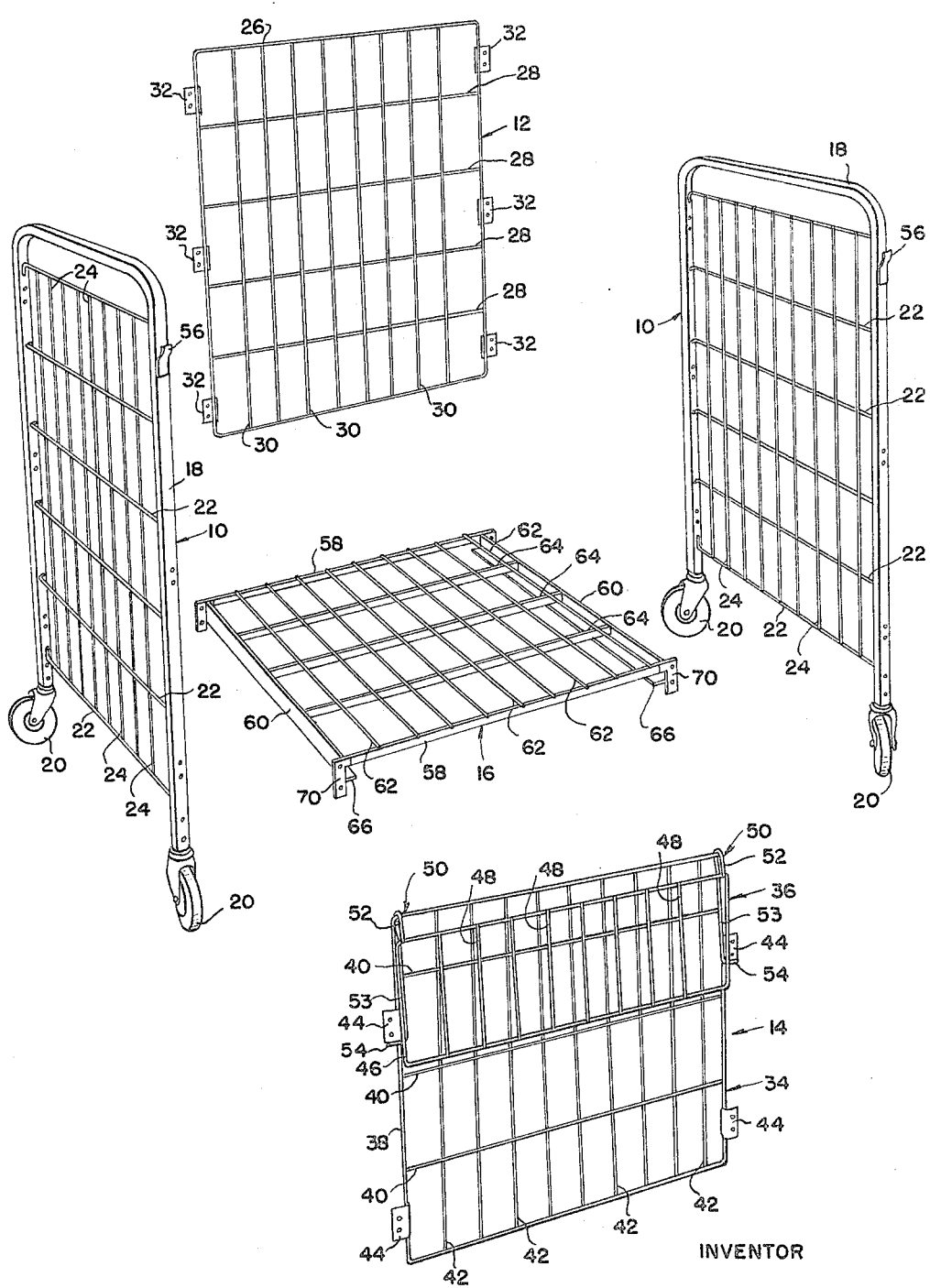
FIG. 2 is a side perspective exploded view of the bottle cart illustrated in FIG. 1 and illustrating the upper portion of the front wall section in its lower position.

As can best be seen in FIG. 2, the side wall sections 10, the rear wall section 12, the front wall section 14, and the floor section 16 of the bottle return cart of the present invention are preferably formed as individual sections and then are secured together by means of the brackets 32, 44 and 70 and blind hole rivets 72 of conventional design extending through the brackets 32, 44 and 70 into the interior of the tubular framing members 18 to form a completed assembly. In this way it is possible to chrome plate the individual sections of the bottle return cart resulting in a substantial reduction in manufacturing costs.

The upper portion 36 of the front wall section 14 is movable from the upper position shown in FIG. 1 to the lower position shown in FIG. 2. In the upper position, the upper portion 36 forms a planar upwardly extending extension of the lower portion 34 so that the front wall section 14 is of the same height as the side wall sections 10 and the rear wall sections 12. In the lower position, the upper portion 36 is pivoted downwardly to a position adjacent the lower portion 34 to form an upper opening to the interior of the cart.

When the return cart is relatively empty, the upper portion 36 would be moved to the lower position to provide access to the bottom of the cart. As the cart fills up, the upper portion 36 would be pivoted about the upper horizontal portion of the wire member 38 to the position shown in FIG. 1 to completely close the front of the cart. In this way, the entire depth of the cart can be used without sacrificing accessibility. The particular means provided for hingedly connecting the upper portion 36 to the lower portion 34 permits a range of movement of the upper portion 36 toward and away from the lower portion 34. This permits the end portions 54 of the hinge and locking means 50 to be brought up and over the hooks 56 so that the upper portion 36 will be securely locked in place to increase the capacity of the cart and to prevent bottles from falling from the cart either as they are being placed in the cart or as the cart is being moved to a storage area.

The tray member 68 is provided to collect the liquids remaining in the open bottles and since it is removable, it can be readily removed and cleaned as the need arises.

It is apparent that a bottle return cart has been provided which due to the particular manner of construction and assembly produces a substantial reduction in manufacturing costs for such carts. Further, by providing the upper portion 36 of the front wall section 16 and the particular means for selectively moving this upper portion 36 to either an open position or a closed position, a bottle return cart has been provided in which a substantial increase in the volume to floor space ratio has been achieved without sacrificing accessibility to the interior of the cart.

The particular hinge and locking means 50 provide an economically manufactured readily manipulated means for retaining the upper portion 36 in the desired position.

It is further apparent that although I have described but a single embodiment of the present invention, many changes and modifications can be made therein without departing from the spirit of the invention as expressed by the scope of the appended claims.

I claim:
1. A cart comprising:
 (a) a pair of spaced side wall sections, a front wall section, a rear wall section, a floor section and means connecting said sections together to form an open top receptacle,
 (b) said front wall comprising an upper portion and a fixed lower portion and means hingedly connecting said upper portion to said lower portion,
 (c) said last mentioned means comprising a horizontally extending wire member defining the upper edge of said lower portion, and a closed looped member extending around said wire member and fixed to said upper portion whereby said upper portion can be pivoted about said wire member between an upper position substantially co-planar with and extending upwardly from said lower portion and a lower position substantially parallel with and adjacent to said lower portion, and said upper portion permitting access to said receptacle in all positions,
 (d) means selectively retaining said upper portion in said upper position,
 (e) said looped member being elongated whereby said upper portion is movable toward and away from said lower portion at all pivoted positions a distance substantially equal to the length of the loop formed in said looped member,
 (f) said retaining means comprising a substantially S-shaped hook member secured to one of said side wall sections adjacent said front wall section, said looped member including an outwardly extending end portion fixedly attached to said upper portion and disposed to be received by said hook member upon said upper portion being pivoted to said upper position and being moved away from said lower portion.

2. The cart as defined in claim 1 and in which
 (a) said side wall sections comprise framing members forming vertically extending edges thereof, and
 (b) said connecting means comprises brackets carried by said front wall section, said rear wall section and said floor section, each of said brackets having a portion engaging said framing members and means securing said brackets to said framing members.

3. The cart as defined in claim 1 and including a slidably removable tray member carried in said floor section.

4. A cart comprising:
(a) a pair of spaced side wall sections, a front wall section, a rear wall section, a floor section and means connecting said sections together to form an open top receptacle.
(b) said front wall section comprising an upper portion and a fixed lower portion and means hingedly connecting said upper portion to said lower portion,
(c) said last mentioned means comprising a horizontally extending wire member defining the upper edge of said lower portion, and a closed looped member extending around said wire member and fixed to said upper portion whereby said upper portion can be pivoted about said wire member between an upper position substantially coplanar with and extending upwardly from said lower portion and a lower position substantially parallel with and adjacent to said lower portion, and said upper portion permitting access to said receptacle in all positions,
(d) means selectively retaining said upper portion in said upper position,
(e) said retaining means comprising a hook fixed to at least one of said side walls and having a bight portion and a free end, said looped member including an outwardly extending member fixed to said upper portion, and the loop formed in said looped member being elongated in length sufficiently to permit said upper portion to be raised from said upper position and away from said lower portion so that said member clears the free end of said hook, and then said upper portion can be lowered toward said lower portion to permit said member to seat in the bight of said hook.

5. The cart as defined in claim 1 and in which
(a) said front wall section and said rear wall section are of a wire construction including a peripherally extending wire member, and
(b) said brackets being secured to said peripherally extending wire members.

References Cited by the Examiner
UNITED STATES PATENTS

| | | | |
|---|---|---|---|
| 1,559,064 | 10/1925 | Bitney | 211—181 X |
| 1,752,098 | 3/1930 | Macomber | 119—17 X |
| 1,760,936 | 6/1930 | Dean | 119—17 X |
| 1,807,972 | 6/1931 | Dean | 119—17 |
| 2,898,122 | 8/1959 | Beckner | 220—19 X |
| 3,162,462 | 12/1964 | Elders | 280—79.2 X |
| 3,168,328 | 2/1965 | Hill | 280—47.34 X |

FOREIGN PATENTS

| | | |
|---|---|---|
| 1,317,569 | 1/1963 | France. |
| 1,380,595 | 10/1964 | France. |

BENJAMIN HERSH, *Primary Examiner.*

C. C. PARSONS, *Assistant Examiner.*